(12) United States Patent
Takahashi et al.

(10) Patent No.: US 9,961,329 B2
(45) Date of Patent: May 1, 2018

(54) IMAGING APPARATUS AND METHOD OF CONTROLLING SAME

(71) Applicant: CANON KABUSHIKI KAISHA, Tokyo (JP)

(72) Inventors: Takahiro Takahashi, Yokohama (JP); Satoru Komatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 361 days.

(21) Appl. No.: 14/340,824

(22) Filed: Jul. 25, 2014

(65) Prior Publication Data
US 2015/0035824 A1 Feb. 5, 2015

(30) Foreign Application Priority Data

Aug. 2, 2013 (JP) ................................ 2013-161267

(51) Int. Cl.
*G06T 15/00* (2011.01)
*H04N 13/02* (2006.01)

(52) U.S. Cl.
CPC ..... *H04N 13/0271* (2013.01); *H04N 13/0235* (2013.01)

(58) Field of Classification Search
None
See application file for complete search history.

(56) References Cited

U.S. PATENT DOCUMENTS

| | | |
|---|---|---|
| 4,965,840 A | 10/1990 | Subbarao |
| 5,838,836 A | 11/1998 | Omvik |
| 2004/0096096 A1* | 5/2004 | Huber ................ G06K 9/00201 382/152 |
| 2004/0131348 A1 | 7/2004 | Ohba et al. |
| 2009/0015662 A1* | 1/2009 | Kim ..................... H04N 19/593 348/43 |
| 2012/0056984 A1* | 3/2012 | Zhang ................ H04N 13/0022 348/43 |
| 2012/0084652 A1* | 4/2012 | Martinez Bauza .......................... H04N 13/0007 715/719 |
| 2013/0077880 A1* | 3/2013 | Venkataraman .......... G06T 9/00 382/232 |

(Continued)

FOREIGN PATENT DOCUMENTS

| | | |
|---|---|---|
| JP | H01-167610 A | 7/1989 |
| JP | H04-138577 A | 5/1992 |

(Continued)

OTHER PUBLICATIONS

Official Action dated Jul. 4, 2017, in Japanese Patent Appln. No. 2013-161267.

(Continued)

*Primary Examiner* — Andrew G Yang
(74) *Attorney, Agent, or Firm* — Fitzpatrick, Cella, Harper & Scinto

(57) ABSTRACT

An imaging apparatus comprising: an image acquisition unit configured to acquire an image; a depth map acquisition unit configured to acquire a first depth map; a working range map generation unit configured to generate a working range map showing a working range in the image on the basis of the first depth map; a synthesizing unit configured to synthesize the image and the working range map and to generate a synthesized image; and a display unit configured to display the synthesized image.

15 Claims, 10 Drawing Sheets

(56) References Cited

U.S. PATENT DOCUMENTS

| | | | | |
|---|---|---|---|---|
| 2013/0258096 A1* | 10/2013 | Ali | ............... | G06T 7/0069 |
| | | | | 348/135 |
| 2013/0300860 A1 | 11/2013 | Komatsu | | |
| 2013/0307966 A1 | 11/2013 | Komatsu | | |
| 2014/0184586 A1* | 7/2014 | Kelley | ............... | H04N 5/23212 |
| | | | | 345/419 |

FOREIGN PATENT DOCUMENTS

| | | |
|---|---|---|
| JP | H09-153983 A | 6/1997 |
| JP | 2003-284096 A | 10/2003 |
| JP | 2007-139892 A | 6/2007 |
| JP | 2012-124555 A | 6/2012 |
| WO | 02/082805 A1 | 10/2002 |

OTHER PUBLICATIONS

Takahiro Takahashi et al., U.S. Appl. No. 14/444,119, filed Jul. 28, 2014.
Satoru Komatsu, U.S. Appl. No. 14/453,888, filed Aug. 7, 2014.
Satoru Komatsu, U.S. Appl. No. 14/528,250, filed Oct. 30, 2014.

* cited by examiner

IMAGING APPARATUS AND METHOD OF CONTROLLING SAME

BACKGROUND OF THE INVENTION

Field of the Invention

The present invention relates to an imaging apparatus and particularly relates to an imaging apparatus capable of acquiring a depth map.

Description of the Related Art

As conventional approaches to acquire a depth map simultaneously with an image for viewing, there are a stereo approach (e.g., Patent Literature 1), depth from defocus (DFD) (Patent Literature 2), depth from focus (DFF) (Patent Literature 3), and the like. These approaches are passive approaches that do not require special lighting and therefore are suitable for a general imaging apparatus. DFD and DFF are methods in which, based on blurs in shot images being different depending on the depth to a photo scene from an imaging apparatus, the difference in blur of a group of images (two or more images) shot under a plurality of shooting conditions are analyzed to calculate a depth map. The stereo method, on the other hand, is based on the principle of triangulation and calculates a depth map of a target scene on the basis of parallax acquired from the correspondence relationship of respective pixels within shot images of two or more viewing points. Embodiments of the stereo method take various forms such as arranging a plurality of imaging apparatuses or dividing a pupil of an optical system to acquire images of two viewing points with one imaging apparatus.

A depth map calculated in this manner can be applied to various image processing for use in a clip function of clipping out a main subject area or for use in a background blur function of blurring a region other than a main object to artificially narrow the depth of field.

Patent Literature 1: Japanese Patent Application Laid-open No. H04-138577

Patent Literature 2: Japanese Patent Application Laid-open No. H01-167610

Patent Literature 3: International Publication No. WO 2002/082805

SUMMARY OF THE INVENTION

As described above, a depth map necessary for an image processing effect desired by a user needs to be acquired in order to perform image processing using the depth map in a manner desired by a photographer. Specifically, in the case of a representation in which blur is changed continuously using a depth map with respect to a scene having continuous depth, it is necessary to acquire a depth map in a range in the depth direction for which change is intended. However, in a depth map acquiring approach such as the DFD, DFF, or stereo method, as described later, the depth range (hereinafter referred to as working range) of an acquirable depth map depends on the parameter at the time of acquiring the depth map. Thus, it is necessary to appropriately set the parameter in order to acquire a desired working range. For example, in the case where a desired effect is to be acquired in image processing using a depth map, it is necessary to perform parameter setting in order to acquire a depth map having a working range adapted to a photo scene. However, since a depth map conventionally has not been checkable at the time of shooting, there has been a problem that whether or not a desired image processing effect is acquirable cannot be checked until an image processing result after shooting is observed.

In consideration of the problem, an object of the present invention is to provide an imaging apparatus that enables checking of a working range of a depth map to be acquired while shooting.

In order to overcome the above problem, one aspect of the present invention provides an imaging apparatus comprising: an image acquisition unit configured to acquire an image; a depth map acquisition unit configured to acquire a first depth map; a working range map generation unit configured to generate a working range map showing a working range in the image on the basis of the first depth map; a synthesizing unit configured to synthesize the image and the working range map and to generate a synthesized image; and a display unit configured to display the synthesized image.

Another aspect of the present invention provides a method of controlling an imaging apparatus, comprising: an image acquiring step of acquiring an image; a first depth map acquiring step of acquiring a first depth map; a working range map generating step of generating a working range map showing a working range in the image on the basis of the first depth map; a synthesizing step of synthesizing the image and the working range map and generating a synthesized image; and a displaying step of displaying the synthesized image.

With the present invention, it is possible to check the working range of a depth map to be acquired while shooting, and an image processing effect desired by a photographer can be acquired.

Further features of the present invention will become apparent from the following description of exemplary embodiments with reference to the attached drawings.

DESCRIPTION OF THE EMBODIMENTS

The present invention is implemented as one function of an imaging apparatus such as, for example, a digital camera. First, the depth map acquiring principle and the working range for the DFD method, the DFF method, and the stereo method that are passive depth map acquiring approaches will be described. Then, a specific embodiment of the present invention will be described with reference to the drawings. Note that the scope of the present invention is not limited to an example illustrated in the description of the embodiments.

<Depth Measurement Principle and Measurable Depth Range for DFD>
(Principle of Depth Measurement)

In the DFD method, the same subject is shot a plurality of times under different shooting conditions, and a depth map is acquired from the difference in blur of shot images. For the shooting condition, a case where the focus position has been changed two times for shooting will be described. In this specification, the focus bracket amount (FB) that is the amount of change in the focus position refers to the amount of movement (distance between the image surface of a first focus position and the image surface of a second focus position) on the sensor (hereinafter image surface) side, unless otherwise noted.

(Defocus Characteristics of PSF Peak Value)

In the DFD method of this embodiment, depth is estimated using the defocus characteristics of a peak value of a point spread function (PSF) of an optical system. The PSF of an ideal imaging optical system without aberration will be used in the description below. However, an actual imaging optical system can be treated in approximately the same manner.

Figure 5:
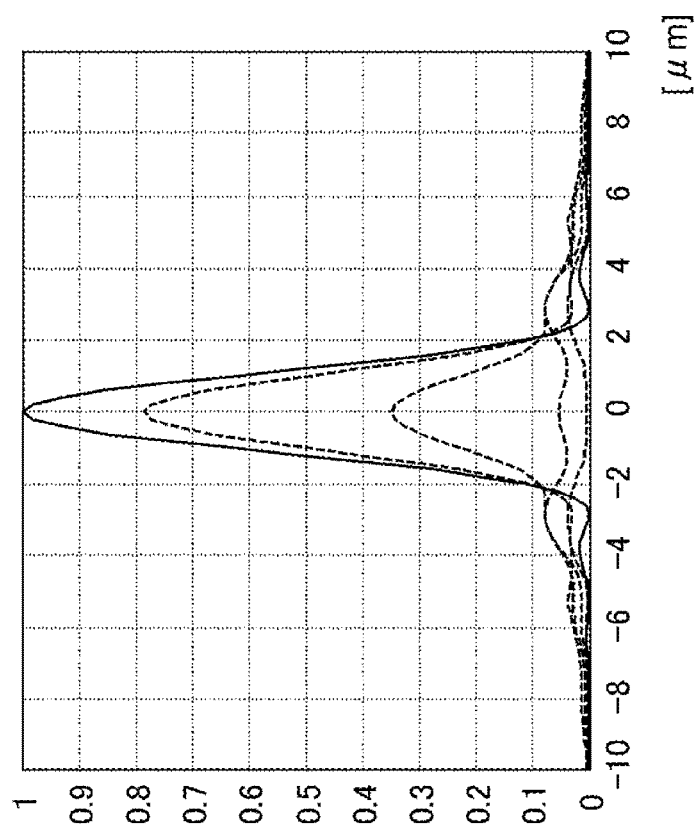
FIG. 5 is a diagram plotting a sectional surface of PSF.

The shape of an ideal PSF without aberration in a focus position is a shape similar to a Gaussian function with a moderate decline from a peak at a value in the center of coordinates of the PSF. FIG. 5 shows the sectional shape of the PSF with a solid line. Along with defocus, the value at the center of coordinates of the PSF decreases, and the shape is lost. Dotted lines in FIG. 5 respectively show sectional surfaces of the PSF in cases where the defocus is by 20 µm, 40 µm, 60 µm, and 80 µm. The value at the center of coordinates of the PSF is defined as "PSF peak value."

Figure 6:
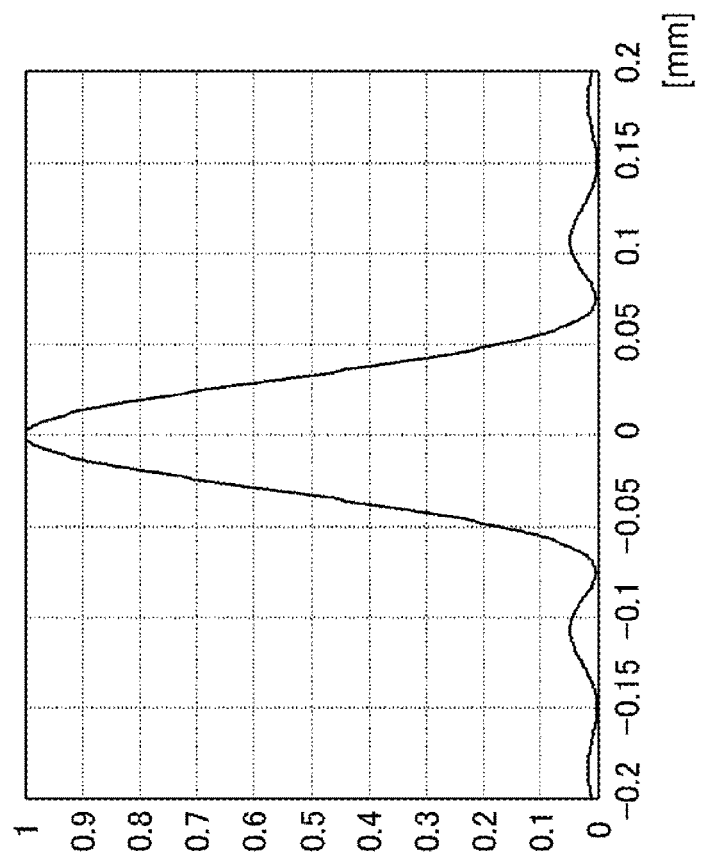
FIG. 6 is a diagram showing the defocus characteristics of a PSF peak value.

FIG. 6 shows the defocus characteristics of the PSF peak value in the ideal imaging optical system without aberration. The abscissa is the defocus amount and the ordinate is the PSF peak value. The shooting conditions are 18.00 mm for focal length of the imaging optical system, 4.00 for the F-number, 3000 mm for object depth, −0.02 mm for focus bracket amount, and 587.56 nm for wavelength. As shown in FIG. 6, the PSF peak value becomes maximum in the focus position, decreases along with defocus, and approaches 0 while oscillating as in a sinc function.

(PSF Peak Ratio)

Next, a method of calculating the depth from the PSF peak value will be described. As shown in FIG. 6, the PSF peak value depends on the defocus amount. Thus, if the PSF peak value can be calculated from a shot image, the defocus amount can be acquired and converted to the depth to a subject. However, due to the influence of spatial frequency or the like of the subject, it is difficult to accurately acquire the PSF peak value of the imaging optical system from one image. Thus, using a plurality of images shot under different shooting conditions, the influence of the subject is removed. In order to cancel the influence of the subject, it is favorable to acquire the ratio. Hereinafter, the ratio of PSF peak values acquired respectively from two images is defined as "PSF peak ratio." In the depth calculation of this embodiment, the depth is calculated by acquiring the correspondence of the defocus characteristics of the PSF peak ratio of the imaging optical system acquired theoretically and the value of the PSF peak ratio acquired from two images that are actually shot.

Figure 7:
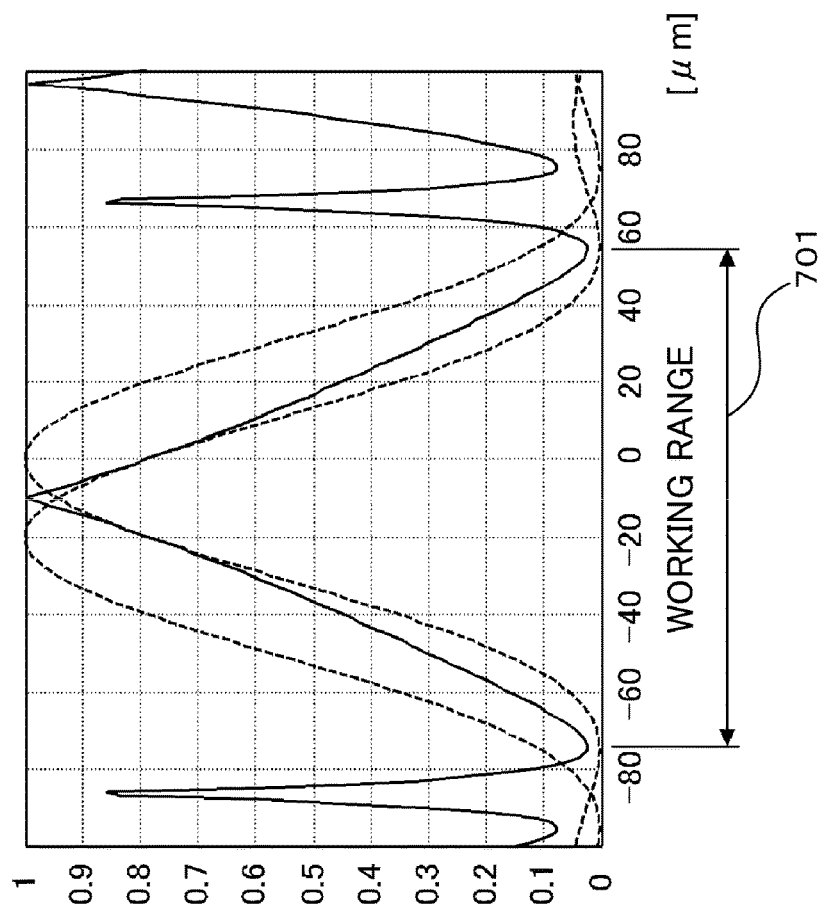
FIG. 7 is a diagram showing the characteristics of a PSF peak ratio.

FIG. 7 shows the defocus characteristics of the PSF peak value of each of two images and the defocus characteristics of the PSF peak ratio that are acquired theoretically. The shooting conditions are the same as in FIG. 6. The abscissa is the focus position on the image surface side. In FIG. 7, two curved lines shown as dotted lines are the defocus characteristics of the two PSF peak values of different focus positions, and a curved line shown as a solid line is the defocus characteristics of the PSF peak ratio. The peak ratio is normalized with the larger peak as the denominator. As a result, the PSF peak ratio forms a symmetric curve of which the maximum value is 1, the peak is at the intermediate position between the two focus positions, and the value decreases away from the peak.

From two images that are actually shot, the PSF peak ratio of respective points (pixels or image groups) within the image is acquired, and the value is compared with the defocus characteristics shown with the solid line in FIG. 7. Thus, how far an object shown at the respective points within the image is from the reference focus position can be calculated. In the case of FIG. 7, the reference focus position is the intermediate position between the focus positions of the two images. It is also possible to distinguish the near side (imaging apparatus side) and the far side relative to the reference focus position, depending on which PSF peak value has been used for normalization (which PSF peak value is larger).

In order to acquire a depth Z0 on the object side from the PSF peak ratio, a defocus amount Zi from the focus position on the image surface is first acquired from the value of the PSF peak ratio. Next, an image surface side depth s' is acquired with expression 1 from a focal length f and an object depth s and converted to the depth Z0 with expression 2 using the defocus amount Zi.

[Math. 1]
$$s' = \frac{sf}{(f+s)} \quad \text{(Expression 1)}$$

[Math. 2]
$$Z_0 = \frac{f(s'+Z_i)}{f+(s'+Z_i)} \quad \text{(Expression 2)}$$

(Method of Calculating PSF Peak Ratio from Image)

A method of calculating the PSF peak ratio from two images acquired through actual shooting will be described. For the two images, corresponding local regions I1 and I2 are represented with a convolution of a scene s with PSF1 and PSF2. Assuming the regions after Fourier transform as FI1 and FI2 and the Fourier transform of the scene s as S, the ratio is represented with expression 3.

[Math. 3]
$$\frac{FI2}{FI1} = \frac{F\{PSF2 \otimes s\}}{F\{PSF1 \otimes s\}} = \frac{OTF2 \cdot S}{OTF1 \cdot S} = \frac{OTF2}{OTF1} = OTFr \quad \text{(Expression 3)}$$

Herein, assume an optical transfer function that is the Fourier transform of the PSF as OTF, and the ratio of two OTFs as OTFr. Due to the scene S being cancelled out as shown in expression 3, the OTFr is a value that does not depend on the scene. In order to acquire a PSF peak ratio PSFr from the OTFr, it suffices to acquire a mean value of the OTFr as shown in expression 4. Assuming that the peak of the PSF is in the center of the images I1 and I2, the following holds for the PSF peak ratio PSFr.

[Math. 4]

$$PSFr(0, 0) = F^{-1}\{OTFr(u, v)\}(x = 0, y = 0) = \frac{1}{\iint dudv}\iint OTFr(u, v)dudv \quad \text{(Expression 4)}$$

The following is a discrete representation of the same.

[Math. 5]

$$PSFr(0, 0) = \frac{1}{NuNv}\sum_{i=1}^{Nu}\sum_{j=1}^{Nv} OTFr(ui, uj) \quad \text{(Expression 5)}$$

By comparing the PSF peak ratio PSFr calculated from the images with expression 5 with the defocus characteristics of the PSF peak ratio shown in FIG. 7, the defocus amount, i.e., depth information, of the object shown in the local regions I1 and I2 can be acquired.

(Working Range)

Next, the measurable depth range (hereinafter working range) in a depth measurement using the PSF peak ratio will be described using FIG. 7. As shown with the solid line in FIG. 7, the defocus characteristics of the PSF peak ratio gradually decrease in value from the intermediate position between the two different focus positions. There is a rise after a minimum value is reached, and this is repeated. This is due to the oscillation in the defocus characteristics of the PSF peak value, as shown in FIG. 6. Hereinafter, the maximum peak in a curve of the defocus characteristics such as the PSF peak value or the PSF peak ratio is referred to as "maximum peak" or "primary peak," and a minimum value that first appears on each of the front side and the rear side of the maximum peak is referred to as "primary minimum value."

As can be seen from the defocus characteristics of the PSF peak value in FIG. 6, the PSF peak value after the primary minimum value is small in value and easily influenced by noise or the like. Therefore, variation in the ratio is large, and reliability is low. Thus, for the defocus characteristics of the PSF peak ratio (solid line in FIG. 7), the working range is a working range 701 between a position of the primary minimum value on the front side and a position of the primary minimum value on the rear side of the maximum peak. Since the precision is reduced in reality by noise or the like when the PSF peak ratio is close to zero, it is desirable to set the measurable range to a range slightly narrower than between the primary minimum value on the front side and the primary minimum value on the rear side. In the example of FIG. 7, −75 μm to 55 μm is the measurable range. In the drawing, the negative direction is the front side.

The position of the primary minimum value of the PSF peak ratio that specifies the measurable range depends on the position of the primary minimum value of the defocus characteristics (FIG. 6) of the PSF peak value. That is, as shown in FIG. 7, the position of the primary minimum value of the PSF peak ratio on the front side corresponds to the position of the primary minimum value on the front side for the PSF peak value of an image of which the focus position is on the rear side out of the two images with different focus positions. The position of the primary minimum value of the PSF peak ratio on the rear side corresponds to the position of the primary minimum value on the rear side for the PSF peak value of an image of which the focus position is on the front side. That is, the measurable range is determined by the defocus characteristics of the PSF peak value (interval of the front and rear primary minimum values) and the focus bracket amount.

Assuming the F-number of the optical system as F and the wavelength of light as λ, the interval of the primary minimum values on the front side and the rear side in the defocus characteristics of the PSF peak value in the optical system (without aberration) can be acquired as about $15F^2\lambda$. (The word "about" is inserted because, strictly speaking, the interval of the front and rear primary minimum values takes a value between $15F^2\lambda$ and $16F^2\lambda$.) Thus, assuming the focus bracket amount as Fb, a measurable range R is represented with the following expression.

[Math. 6]

$$R \leq 15F^2\lambda - Fb \quad \text{(Expression 6)}$$

(Focus Bracket Amount and Characteristics of PSF Peak Ratio)

Next, the relationship of the focus bracket amount and a change in the measureable range and the relationship of the focus bracket amount and a change in the value range of the PSF peak ratio will be described. FIGS. 8A to 8F show the defocus characteristics of the PSF peak value in the case where the focus bracket amount is changed and the change in the PSF peak ratio. The focus bracket amount is the difference in the abscissa direction for the defocus characteristics (dotted line) of two PSF peak values. That is, in FIGS. 8A to 8F, the focus bracket amount is gradually increased. An example is shown in which the value at the intersection of the defocus characteristics of two PSF peak values (intersection of the dotted lines) is set to be 99.8%, 90%, 70%, 50%, 20%, and 5% of the maximum value of the PSF peak value. It can be seen that the characteristics of the PSF peak ratio (solid line) changes along with the increase in the focus bracket amount. Specifically, as the focus bracket amount increases, it can be seen that the measureable range (range between the primary minimum value position on the front side and the primary minimum value position on the rear side of the maximum peak of the PSF peak ratio) becomes narrower. Such characteristics are clear from expression 6.

The value range of the PSF peak ratio (difference of the maximum value and the primary minimum value of the PSF peak ratio) broadens drastically as the focus bracket amount increases and then gradually approaches 1. With a broader value range of the PSF peak ratio, the depth resolution is higher, durability with respect to a fluctuation factor such as noise is higher, and the depth estimation precision improves. As the focus bracket amount increases, the defocus characteristics of the PSF peak ratio become steep. This also influences the depth resolution (estimation precision). This is because a change in the value of the PSF peak ratio is easily detected with a slight depth difference, if the inclination of the PSF peak ratio is large.

Figure 9A:
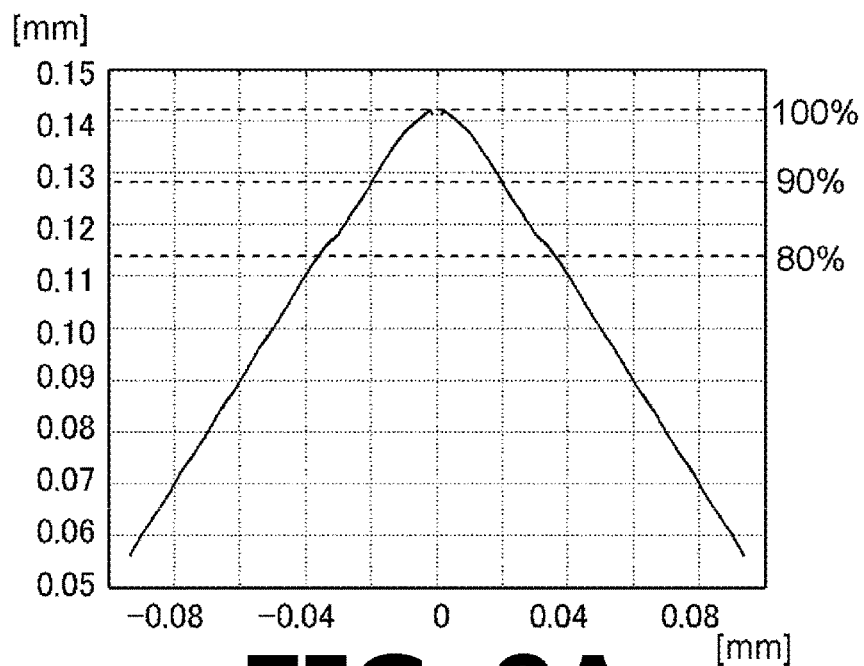
FIGS. 9A and 9B are diagrams showing the measurement range and the FB amount dependency in a value range of the PSF peak ratio.
Figure 9B:
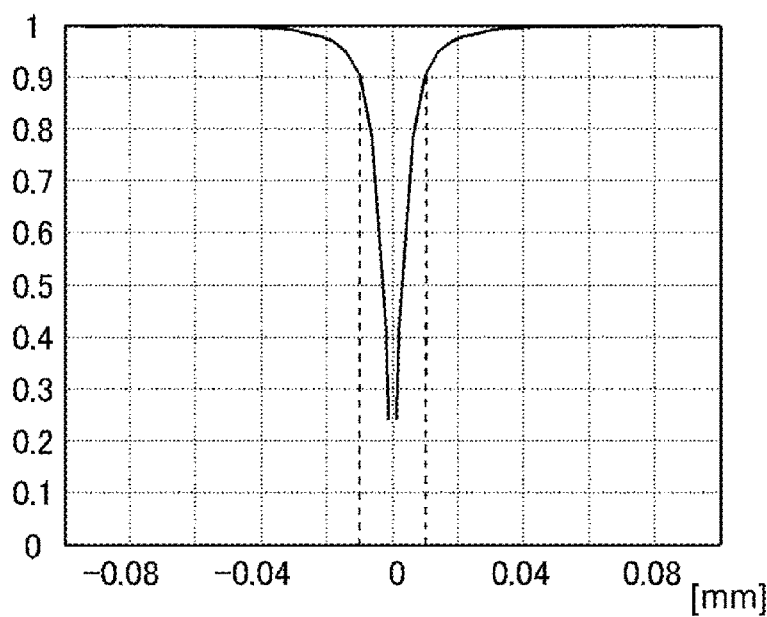

The change in the measureable range along with the focus bracket amount and the change in the value range of the PSF peak ratio are respectively shown in FIGS. 9A and 9B. In FIG. 9A, the abscissa is the focus bracket amount, and the ordinate is the measurement range on the image surface side. In a similar manner, the abscissa is the focus bracket amount, and the ordinate is the value range of the PSF peak ratio in FIG. 9B. Since the PSF peak ratio is normalized, the maximum value of the value range is 1. A case where the focus bracket amount is 0 results in a singularity, since depth cannot be measured. From FIGS. 9A and 9B, it can be seen that the depth resolution (estimation precision) improves as the focus bracket amount increases, although the measureable range becomes narrower.

(Policy for Optimum Shooting Condition)

As shown in expression 6, the working range (R) is given with a function of the F-number (F), the wavelength ($\lambda$), and the focus bracket amount (FB). As can be seen from FIGS. 9A and 9B, not only the working range (R) but also the depth resolution (estimation precision) changes when the focus bracket amount (FB) is changed. Thus, in the case where a measurement condition such as the desired depth range or precision is given, it is desirable to appropriately set the shooting condition, such as the focus position upon shooting each image or the F-number of the optical system, to satisfy the measurement condition.

The basic idea is as follows. It is recommended that the F-number upon shooting two images be made smaller for a narrower depth range to be measured. This is because an improvement in the depth resolution (estimation precision) can be expected, due to the depth of field becoming shallower (the defocus characteristics of the PSF peak ratio becoming steeper) as the F-number is decreased. It suffices to appropriately determine the focus bracket amount at this time according to the F-number. In the case of an imaging apparatus in which the F-number cannot be changed, it suffices to increase the focus bracket amount for a narrower depth range to be measured. This is because the depth resolution (estimation precision) improves as the focus bracket amount is increased, as described above.

One example of a specific method of determining the F-number and the focus bracket amount will be described. First, the F-number (F) and the focus bracket amount (FB) are designed using the following relational expression. That is, the focus bracket amount is taken as an amount proportional to the depth of field. In expression 7, k is a coefficient for adjusting the magnitude of the focus bracket amount, and $\lambda$ is the wavelength.

[Math. 7]

$$FB = kF^2\lambda \quad \text{(Expression 7)}$$

Substituting this into expression 6 results in the following expression 8.

[Math. 8]

$$R \leq (15-k) \times F^2 \lambda \quad \text{(Expression 8)}$$

For example, in the case where a working range r is given, an F-number that satisfies the depth range r can be determined using expression 8 (assuming that the coefficient k and the wavelength $\lambda$ are determined in advance). Specifically, the F-number is determined such that $r \leq R$, i.e., as follows.

[Math. 9]

$$F \geq \sqrt{\frac{r}{(15-k) \times \lambda}} \quad \text{(Expression 9)}$$

For example, it suffices to select the minimum F-number satisfying expression 9 among F-number s settable in an imaging optical system. By substituting the F-number into expression 7, the focus bracket amount FB can be determined. It suffices to determine the focus positions (positions on the image surface side) when taking the two images respectively as rc−FB/2 and rc+FB/2 with a center position rc of the depth range r as the reference. With the method described above, the F-number, the focus bracket amount, and the focus position of each of the two images can be determined as shooting conditions under which the measureable range R is measurable.

(Coefficient k)

Next, a preferable value for the coefficient k will be described. The inventor of the present invention has found the following to be preferable for the value of the coefficient k through simulation and experiment. The coefficient k should be a value in a range of 0<k<15. This is because a subject becomes too blurred and the measurement precision decreases when k is larger than 15. Since the difference in blur cannot be acquired from images with the same focus position, k=0 is excluded. In the case where the purpose of depth measurement is a two-layer separation in depth, i.e., to determine whether or not a subject is included in a certain depth range, it is recommended that the coefficient k be set in a range of 8<k<15. With a larger coefficient k, the focus bracket amount is made larger, and the measureable range is made narrower (see FIGS. 8E and 8F). A narrow measureable range means that the value of the PSF peak ratio changes greatly depending on whether a subject is present at around a certain depth. Thus, in the case of a two-layer separation, it is recommended that the focus bracket amount be increased to a certain extent.

Figure 8A:
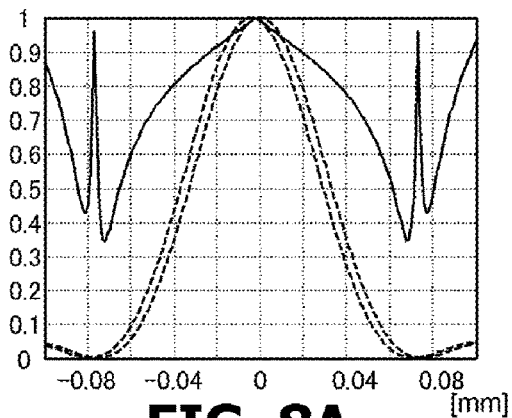
FIGS. 8A to 8F are diagrams showing a change in PSF peak ratios along with a change in FB amount.
Figure 8B:
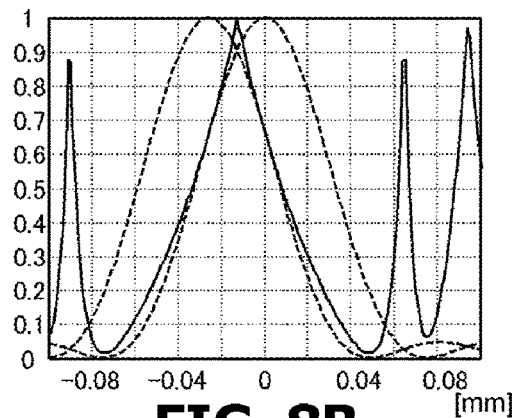
Figure 8C:
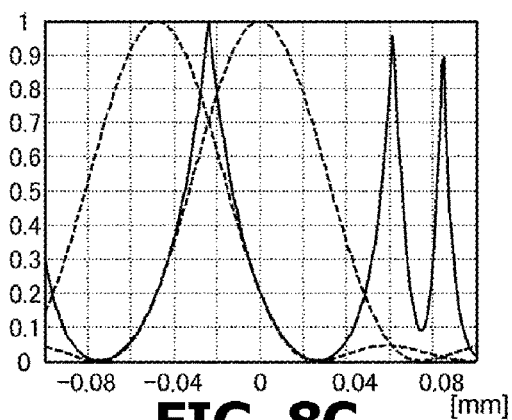
Figure 8D:
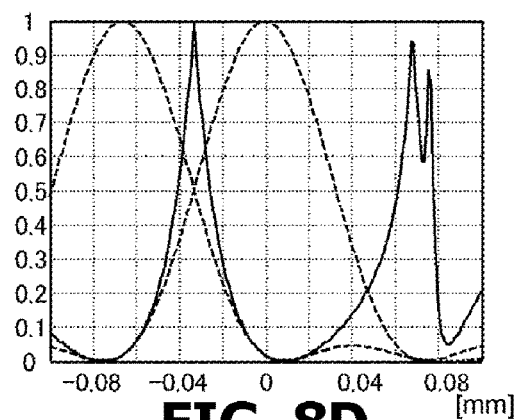
Figure 8E:
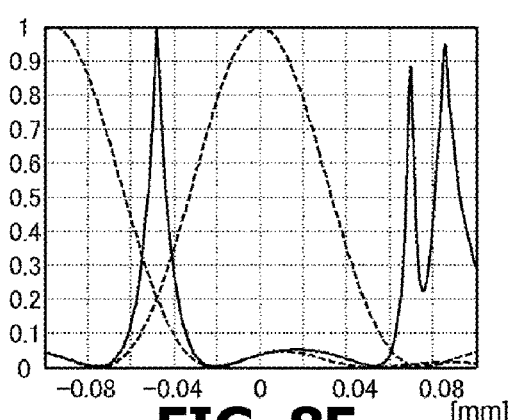
Figure 8F:
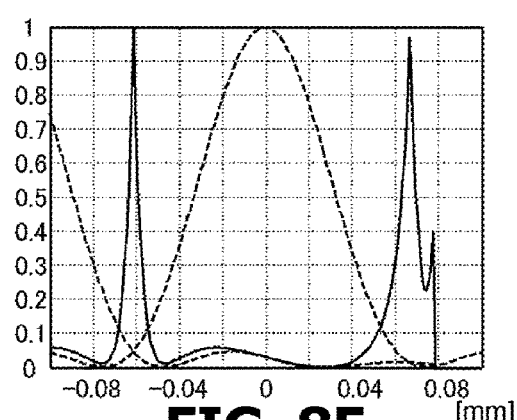

In the case where the purpose of depth measurement is a multilayer separation in depth, i.e., to determine which one of three or more depth ranges a subject is included in, it is recommended that the coefficient k be set in a range of 1<k≤8. This is because, as shown in FIGS. 8B to 8D, a smaller coefficient k is suitable for separation into two or more layers, since the focus bracket amount is made smaller and the measureable range is broadened. The reason a range of 0<k≤1 is excluded is due to unsuitability for separation into multiple layers (see FIG. 8A), since the depth resolution decreases in contrast to the measureable range being broadened in this case. Further, the coefficient k is preferably a value in a range of 2≤k<4. In this range, the balance between the breadth of the measurable range and the depth resolution is particularly favorable, and it is possible to measure a broad depth range with high precision (see FIGS. 8B and 8C). As described above, it suffices to appropriately set the value of the coefficient k in a range of 0 to 15 in accordance with the purpose of the depth measurement.

In the DFD method, as described above, there is a relevance in the working range and the shooting condition for two images. That is, in order to acquire a correct depth map with a desired working range, it is necessary to set the shooting condition in accordance with the scene.

<Depth Measurement Principle and Measurable Depth Range for DFF Method>

In the case of the DFF method, the focus position for maximum focus within a subject region is determined from a plurality of images acquired by changing the focus position, and the depth on the object side can be calculated from the position using an image formation formula of expression 2. Depending on the range in which the focus position is moved, the working range is determined. However, it can easily be imagined that there is a tradeoff relationship, such as broadening of the moving range of the focus position resulting in a rough moving step of the focus position due to corresponding time consumption.

<Stereo Method>

Figures 10A, 10B:
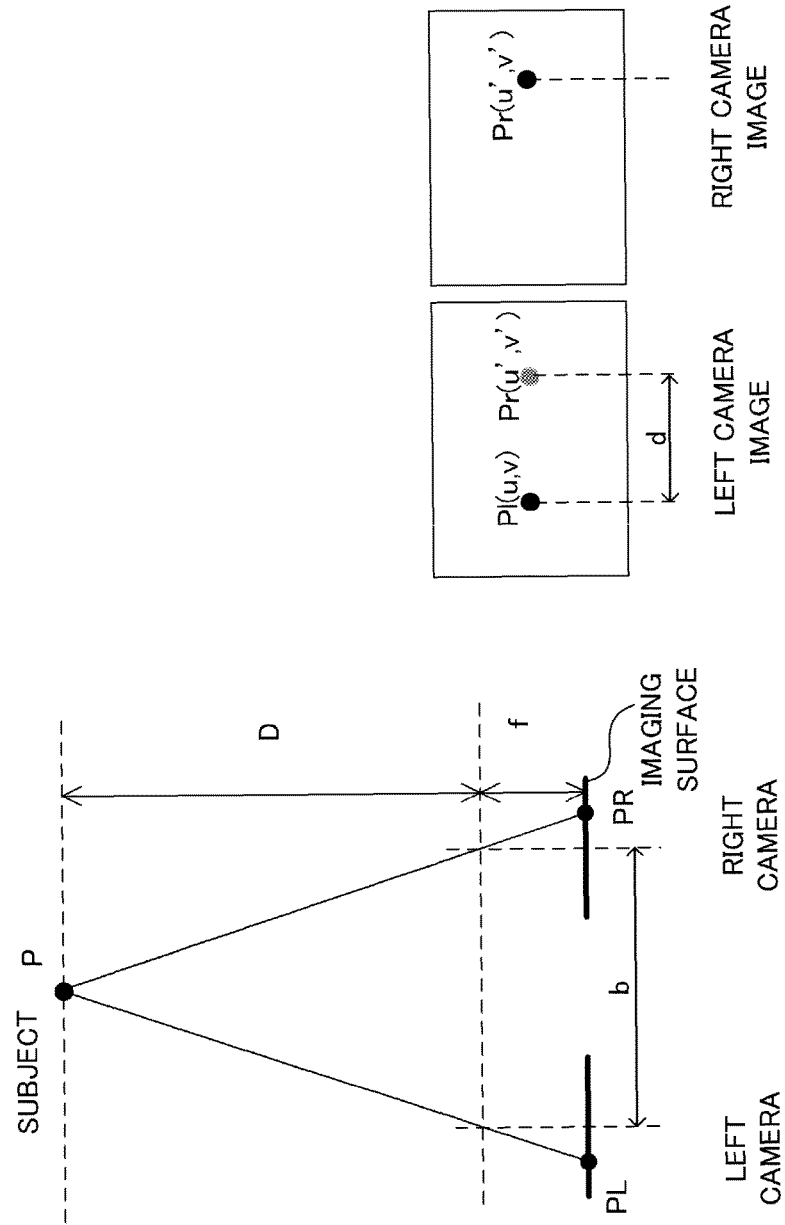
FIGS. 10A and 10B are diagrams showing the principle of the stereo method.

Next, using FIGS. 10A and 10B, the depth measurement principle and the measurable depth range for the stereo method will be described. FIG. 10A is a schematic view of a situation seen from above where a point P within three dimensional space is shot using two cameras having the same focal length. Respective imaging units are adjusted such that the optical axes are parallel and installation is at the same height. FIG. 10B shows images respectively acquired with the left and right imaging units.

Assume that the point P is shown at Pl (u, v) and Pr (u', v') respectively in the left camera and the right camera. When the depth to the point P excluding the focal length is represented as D, the focal length of the imaging unit as f, the depth (hereinafter referred to as base line length) between the optical axes of the imaging units as b, and the difference (hereinafter parallax) of positions Pl and Pr of the point P in the images acquired with the respective cameras as d, D can be calculated with expression 10.

[Math. 10]

$$D = \frac{bf}{d} = \frac{bf}{(u-u')} \quad \text{(Expression 10)}$$

Since the imaging units are corrected such that the optical axes are parallel and the height is the same, it suffices to consider only a change in the horizontal direction, as shown in expression 10, for the parallax d. In the case where the optical axes and heights of the respective imaging units are not corrected, correction in advance is necessary. As shown in expression 10, f is determined uniquely by determining the optical system. However, the base line length b and the parallax d need to be set appropriately depending on the resolution necessary for the depth to the target of measurement. The base line length can be dealt with by changing the arrangement of the camera.

Generally, parallax needs to be calculated and acquired for all pixels at corresponding points in the left and right images and is acquired by image processing such as block matching in which a local region of a reference image is searched from the other image. The minimum resolution of parallax at this time depends on the search precision of the block matching and is the pixel interval or subpixel interval. The value range of parallax depends on the search range of block matching and is determined by the parallax corresponding to the depth to the foreground to be measured in a photo scene and the tolerable calculation time. That is, if the search range is narrow, a subject nearer than a certain depth cannot be detected. In this manner, there is a tradeoff relationship between the search range and the measurable range in the stereo method.

The relationship of the depth map acquiring principle and the working range in each approach of DFD, DFF, and the stereo method as the passive depth map acquiring approach has been described above. In all of the approaches, the working range is relevant to a parameter set in advance. Therefore, it can be seen that adjustability in accordance with the subject or shooting condition is desirable.

Example 1

A preferred embodiment of the present invention will be described below with reference to the drawings. Note that the scope of the invention is not limited to an example illustrated in the description of the embodiments.

(Configuration)

Figure 1:
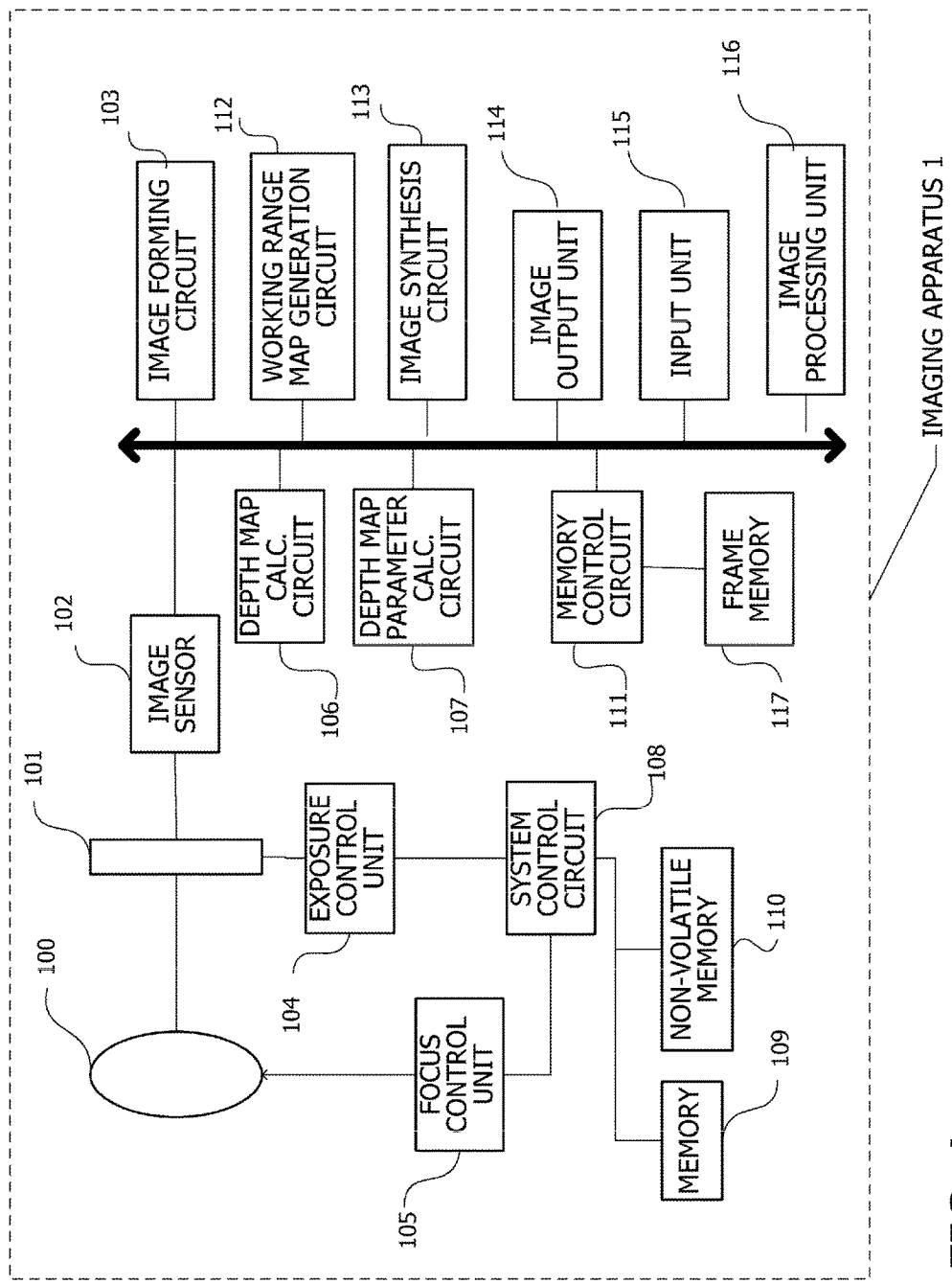
FIG. 1 is a block diagram showing the configuration of an imaging apparatus according to Example 1.

FIG. 1 schematically shows the configuration of an imaging apparatus 1 according to this embodiment. The imaging apparatus 1 acquires a depth map with the DFD method. A lens 100 guides subject light to an image sensor 102. An exposure control member 101 includes an aperture, shutter, and the like. Subject light that has entered through the lens 100 enters the image sensor 102 via the exposure control member 101. The image sensor 102 is an image sensor typically configured of an image sensor such as a CCD or CMOS, so that subject light is converted into an electrical signal and output. An image forming circuit 103 is an image forming circuit for digitalizing and imaging an analog signal output from the image sensor 102. The image forming circuit 103 is configured of an analog/digital conversion circuit, an auto gain control circuit, an auto white balance circuit, a pixel interpolation processing circuit, a color conversion circuit, and the like (not shown). The image forming circuit 103 corresponds to an image acquisition unit of the present invention. An exposure control unit 104 is a unit that controls the exposure control member 101. A focus control unit 105 is a unit that controls focusing of the lens 100. The exposure control unit 104 and the focus control unit 105 are controlled using, for example, the though-the-lens (TTL) approach (approach in which exposure or focus is controlled by measuring light that has actually passed through a lens for shooting). A depth map calculation circuit 106 is a circuit that calculates a depth map on the basis of two images shot under a shooting condition controlled by a depth map parameter calculation circuit 107, in accordance with the focus position controlled by the focus control unit 105. The depth map parameter calculation circuit 107 is a circuit that calculates a suitable shooting condition for acquiring a depth map from the focus position controlled by the focus control unit 105, the desired working range, or the like. A system control circuit 108 is a control circuit in charge of the behavior of the entire imaging apparatus 1 and performs control of an optical system for shooting and control for digital processing of a shot image. The depth map calculation circuit 106 and the depth map parameter calculation circuit 107 respectively correspond to a depth map generation unit and a parameter changing unit of the present invention.

A memory 109 is a memory using a flash ROM or the like that records data for behavior control used in the system control circuit 108, a processing program, or the like. A non-volatile memory 110 is a non-volatile memory such as an EEPROM that is electrically-erasable and recordable to store information such as various adjusted values. A frame memory 117 is a frame memory that stores several frames of an image generated by the image forming circuit 103. A memory control circuit 111 is a memory control circuit that controls an image signal input to or output from the frame memory 117. A working range map generation circuit 112 is a circuit that generates a working range map representing the working range on the basis of a depth map generated by the depth map calculation circuit 106. An image synthesis circuit 113 is a circuit with which a viewing image generated by the image forming circuit 103 and a working range map generated by the working range map generation circuit 112 are synthesized to generate a display image to be displayed in a display unit (not shown). An image output unit 114 is a function unit for displaying an image generated by the image forming circuit 103 or the image synthesis circuit 113 in an image output device (such as a display) (not shown). An input unit 115 is a function block for accepting an input operation from a user and is configured of a button, switch, touchscreen, or the like. In this example, an image processing unit 116 to which a user can input an operation instructing adjustment of a working range while checking a display image synthesized with a working range map performs image processing (e.g., clipping process or background blurring process) based on a depth map on a viewing image.

(Flow of Processing)

Figure 2:
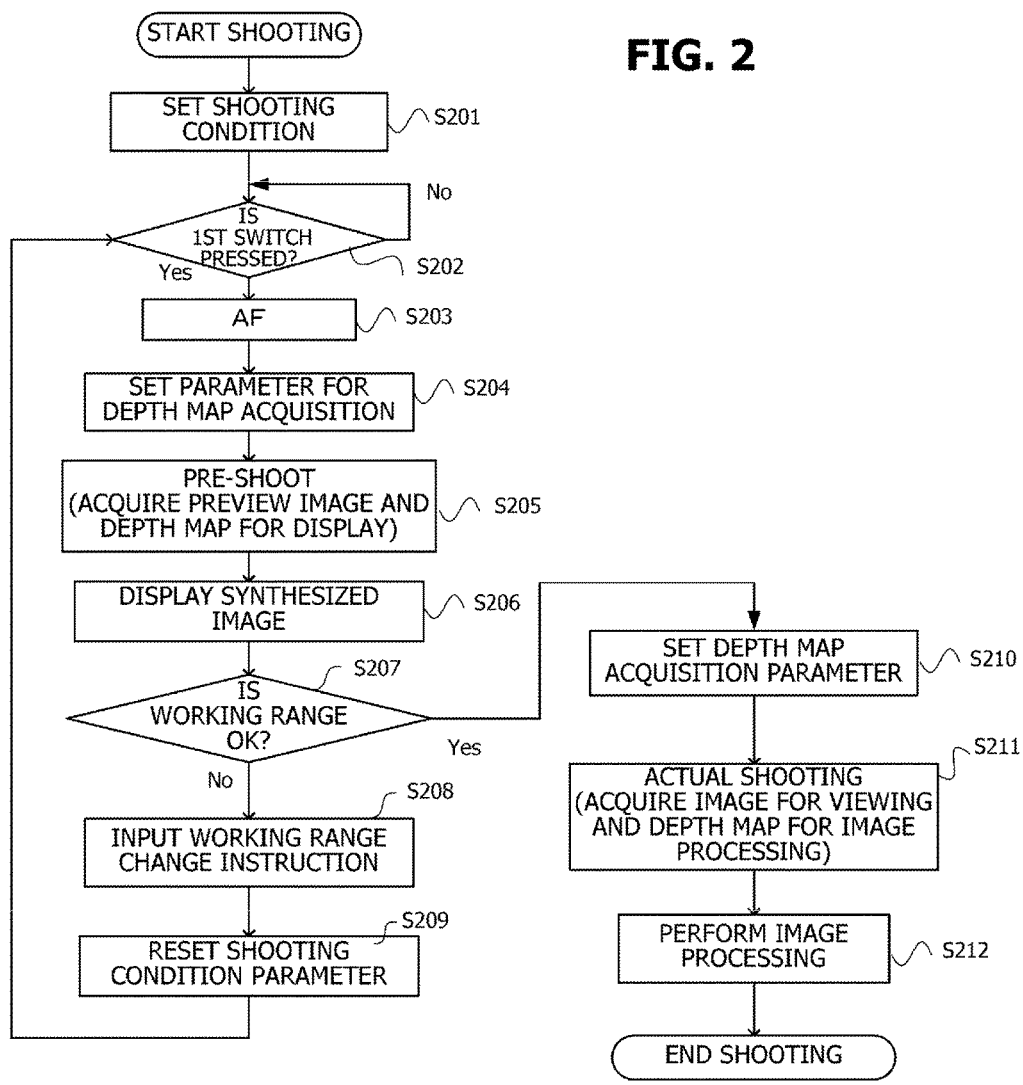
FIG. 2 is a flowchart showing the behavior of the imaging apparatus according to Example 1.

Next, using a flowchart in FIG. 2, the flow of processing from the start to end of shooting in this embodiment will be described. First, in step S201, a photographer performs zooming or the like on a subject, determines the composition, and simultaneously sets a predetermined shooting condition such as the shutter speed or the F-number. The imaging apparatus 1 may automatically determine a part of shooting conditions. Herein, assume that a mode of acquiring a depth map and performing predetermined image processing has been set by a user.

Next, in step S202, whether or not a 1st switch that is a shooting switch has been pressed is determined. In the case where the 1st switch is pressed, nothing is performed. In the case where the 1st switch is not pressed, step S203 is performed.

In step S203, focus adjustment is performed with the composition or shooting condition determined in step S201. A focus adjustment method can be realized with various methods such as the contrast method or phase difference method and is not particularly limited.

In step S204, the depth map parameter calculation circuit 107 performs setting of a shooting condition for depth map acquisition and a parameter of depth map generation (parameter for depth map acquisition). First, as the shooting condition for depth map acquisition, a depth to a main subject in focusing control that is acquired in step S203 is acquired. Subsequently, an initial value r0 of a working range is set. A method of setting the initial value is not particularly limited. It suffices to perform setting from the main subject depths and the focal length or perform determination from the image magnification or the like assumed from the main subject depth. For example, in the case where s equals 2000 mm and the main subject is an upper body of a human being, r0 is about 5 m, assuming a case where the main subject is to be not blurred and the background with continuous depth is to be blurred in accordance with the depth in later image processing. Such a working range initial value may be held in a table, estimated from a predetermined relational expression, or estimated from a setting history or the like of a photographer, and a method is not limited. The depth map parameter calculation circuit 107 determines the focus position of two images for depth map acquisition in accordance with the determined working range. Herein, assume that the focus position of one image is the position of the main subject, and the focus position of the other image is a position changed from the main subject position by a focus bracket amount satisfying the working range.

Further, parameter setting of depth map generation to be performed in step S205 is performed. Since it suffices to generate a depth map with a resolution corresponding to the number of pixels displayable in the display unit (resolution lower than a viewing image), it suffices to perform parameter setting accordingly. Generally, the number of pixels of a display unit is approximately the VGA (640×480 pixels), the calculation cost is reduced and the speed is increased by calculating the position in which a depth map is to be acquired to correspond to the number of pixels. Accordingly, it is possible to check the working range of the depth map before actual shooting.

Next, in step S205, a pre-shoot is performed to acquire a viewing image for display (hereinafter preview image) and a depth map for display. The system control circuit 108 shoots two images according to a shooting parameter set in step S204. The image forming circuit 103 performs predetermined signal processing on the image in which the main subject is in focus out of the two images to generate a preview image. The image quality (resolution or the like) of the preview image may be lower than at the time of actual shooting. The depth map calculation circuit 106 generates the depth map for display on the basis of the two images and the parameter set in step S204. A method of calculating the depth is as shown in expression 1 to expression 5. Based on the PSF peak ratio of the two images with different shooting conditions, the depth map is calculated. A local region may be of any size. Since the depth map is set to be calculated discretely in step S204 at this time, it suffices to perform processing such that a non-calculated region is represented with a calculated region, interpolated, or the like to generate the depth map, and a method is not limited.

In step S205, the working range map generation circuit 112 generates a working range map on the basis of the generated depth map for display. The working range map shows whether or not measurement is possible for each pixel in a map representing a measureable range (depth range). For example, when the depth map is assumed as D and the minimum value and the maximum value of a score representing the working range as smin and smax, a working range map R shows 1 (when smin≤D≤smax) or 0 (at other times).

Next, in step S206, the image synthesis circuit 113 generates a synthesized image in which the working range map and the preview image (viewing image) generated in step S205 are synthesized, and the image output unit 114 displays the synthesized image in an image display device (not shown). The synthesized image is an image that is displayed so that which portion in the preview image is within the working range can be seen. Specifically, assuming the preview image as I, the working range map as R, and the synthesized image for display as I', the synthesized image can be generated on the basis of the following expression.

[Math. 11]

$$I'=I+\alpha \times R \quad \text{(Expression 11)}$$

Note that α is a constant satisfying 0<α<1.

Figure 3A:
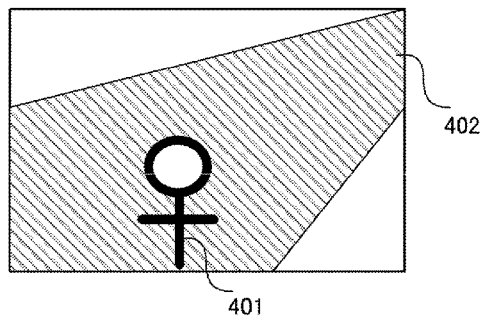
FIGS. 3A to 3E are diagrams schematically showing a display example in a display unit of the imaging apparatus according to Example 1.
Figure 3B:
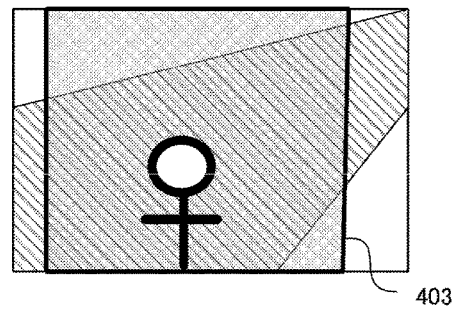

This will be described using FIGS. 3A to 3E. FIG. 3A is a display image in a state where the photographer has determined the composition or shooting condition and represents a scene with a plane of focus at a main subject 401 and a continuous wall 402 in the background. FIG. 3B shows a state of display where the depth map for display is acquired and a working range 403 is synthesized in steps S203 to S206 after the 1st switch has been pressed in step S202. Herein, R representing the working range is represented in a binary manner. However, the synthesized image may be generated with any method, as long as the working range 403 is identifiable. For example, shading or false color may be provided, and a method is not particularly limited.

Next, in step S207, the photographer observes the synthesized image and determines whether or not desired image processing can be achieved in the displayed working range. This state is shown in FIG. 3C.

Figure 3C:
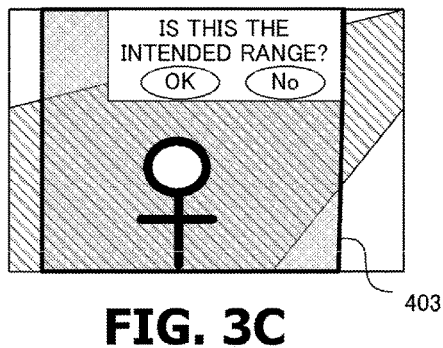
Figure 3D:
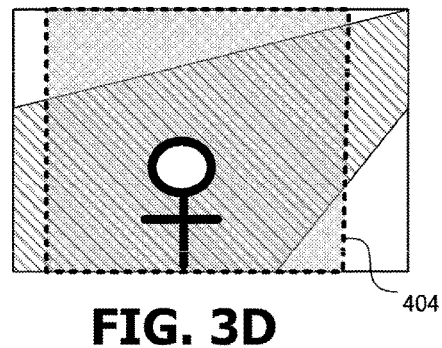

If the current working range is acceptable, the photographer operates the input unit 115 and selects OK in FIG. 3C. In response thereto, the depth map parameter calculation circuit 107 performs parameter setting for acquiring a depth map for image processing in step S210. Specifically, parameter setting is performed to generate a depth map in accordance with the number of pixels (resolution) for eventual recording. Next, in step S211, actual shooting is performed to acquire a viewing image and the depth map. The system control circuit 108 shoots two images on the basis of a shooting parameter set in step S210. The image forming circuit 103 performs predetermined signal processing on the image in which the main subject is in focus out of the two images to generate the viewing image to be stored after predetermined compression processing or the like. The depth map calculation circuit 106 generates the depth map (depth map for image processing) on the basis of the two images and the parameter set in step S210. Then, in step S212, the image processing unit 116 acquires the depth map for image processing, performs image processing on the viewing image on the basis of the depth map, and performs recording in the non-volatile memory 110 after predetermined compression processing or the like is performed.

In step S207, the photographer operates the input unit 115 and selects No in FIG. 3C in the case where the working range is to be changed. Accordingly, processing moves on to step S208, and the photographer is prompted to change the working range. The photographer inputs a change instruction for the working range via the input unit 115. For example, as in FIG. 3D, the photographer changes the working range to be broadened from the current working range 403 to a working range 404 using a user interface (button or touchscreen) (not shown). Any user interface for changing the photo range is acceptable. For example, that enabling scaling or parallel movement of the working range or that enabling a free range designation may be employed.

Next, in step S209, the depth map parameter calculation circuit 107 calculates a shooting parameter for achieving the working range changed in step S208. Specifically, the depth map parameter calculation circuit 107 changes the shooting parameter on the basis of the degree of change in the working range in step S208 to change the working range. For example, the shooting parameter is changed to change the working range, on the basis of the degree of change in size (ratio in size) between the working range 403 before change and the working range 404 after change. Specifically, in the case where the degree of change between the working range 403 before change and the working range 404 after change is larger than a predetermined threshold value (in the case where the amount of displacement between the right side and left side of a quadrangle of the working range 403 and the right side and left side of the working range 404 is larger than the threshold value), the F-number is changed by an amount determined in advance. In the case where the amount of displacement between the working range 403 before change and the working range 404 after change is less than or equal to the predetermined threshold value, the focus bracket amount is changed by a movement amount determined in advance. In the case of increasing the working range, the F-number is increased in value or the focus bracket amount is changed to a small value. In the case of reducing the working range, the F-number is reduced in value, or the focus bracket amount is increased.

Next, in step S209, the depth map parameter calculation circuit 107 calculates a shooting parameter for achieving the working range changed in step S208. Specifically, as described above, the F-number or the focus bracket amount is recalculated and set as the shooting condition. At this time, it is preferable to change the shooting parameter in consideration of the degree of change in size between the working range 403 and the working range 404. Specifically, in the case where the degree of change between the working range 403 and the working range 404 is large, i.e., in the case where the amount of displacement between the right side and left side of the quadrangle of the working range 403 and the right side and left side of the working range 403 is large, the F-number is set to a further larger value. In the case where the amount of displacement between the working range 403 and the working range 404 is small, it suffices to reduce the focus bracket amount by a movement amount determined in advance.

Figure 3E:
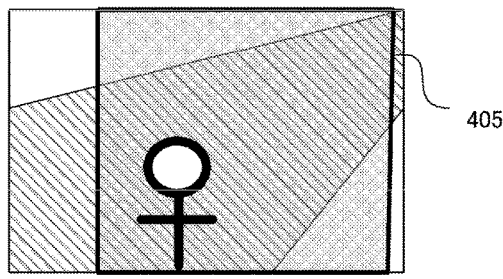

Then, processing is returned to step S202. If the 1st switch is pressed, similar processing of steps S203 and thereafter is performed. FIG. 3E represents a working range 405 upon shooting with the changed shooting condition.

(Effect)

With the imaging apparatus according to this embodiment, as described above, the depth map for display is acquired and synthesized at the time of shooting and displayed in the display unit. Accordingly, the photographer can easily check the current working range for shooting. Further, in the case where the photographer has instructed a change in the working range, the shooting parameter for depth map acquisition is changed automatically, so that measurement is possible in the designated working range. Accordingly, there is an effect that the photographer can acquire the depth map of the desired working range and that a desired image processing result can further be acquired reliably.

(Modified Example)

In the example above, the DFD approach is described as a depth map acquiring method. However, application is also possible in the case of the DFF approach. The DFF approach is suitable for a case where an imaging apparatus can be fixed and a subject is still. In such a case, the overall flow of processing is not changed, and a change in only the respective circuits and content of processing suffices.

First, it suffices that the depth map parameter calculation circuit 107 hold the focus bracket amount and the initial value of range for each shooting condition. It suffices that the depth map calculation circuit 106 calculate an evaluation value such as a contras value within identical local regions in a plurality of shot images and estimate the depth from the image with the highest evaluation value using expression 1 and expression 2 to calculate a depth map. The depth map created in this manner is synthesized with a viewing image and displayed in a similar manner to the case of DFD, and a photographer checks the working range. The photographer gives a change instruction for the working range if necessary. In the case of DFF, the working range is a focus bracket range itself. Therefore, it suffices to increase the range while the number of images is made constant.

In a manner described above, it is possible to check and change the working range of the depth map before shooting is complete also with DFF, and there is an effect that the photographer can reliably acquire a desired image processing result in a similar manner to the case of DFD.

Example 2

Next, as a second example of the present invention, a case where a depth map is acquired with a twin-lens stereo approach and a desired image processing is performed will be described using the drawings.

(Configuration)

Figure 4:
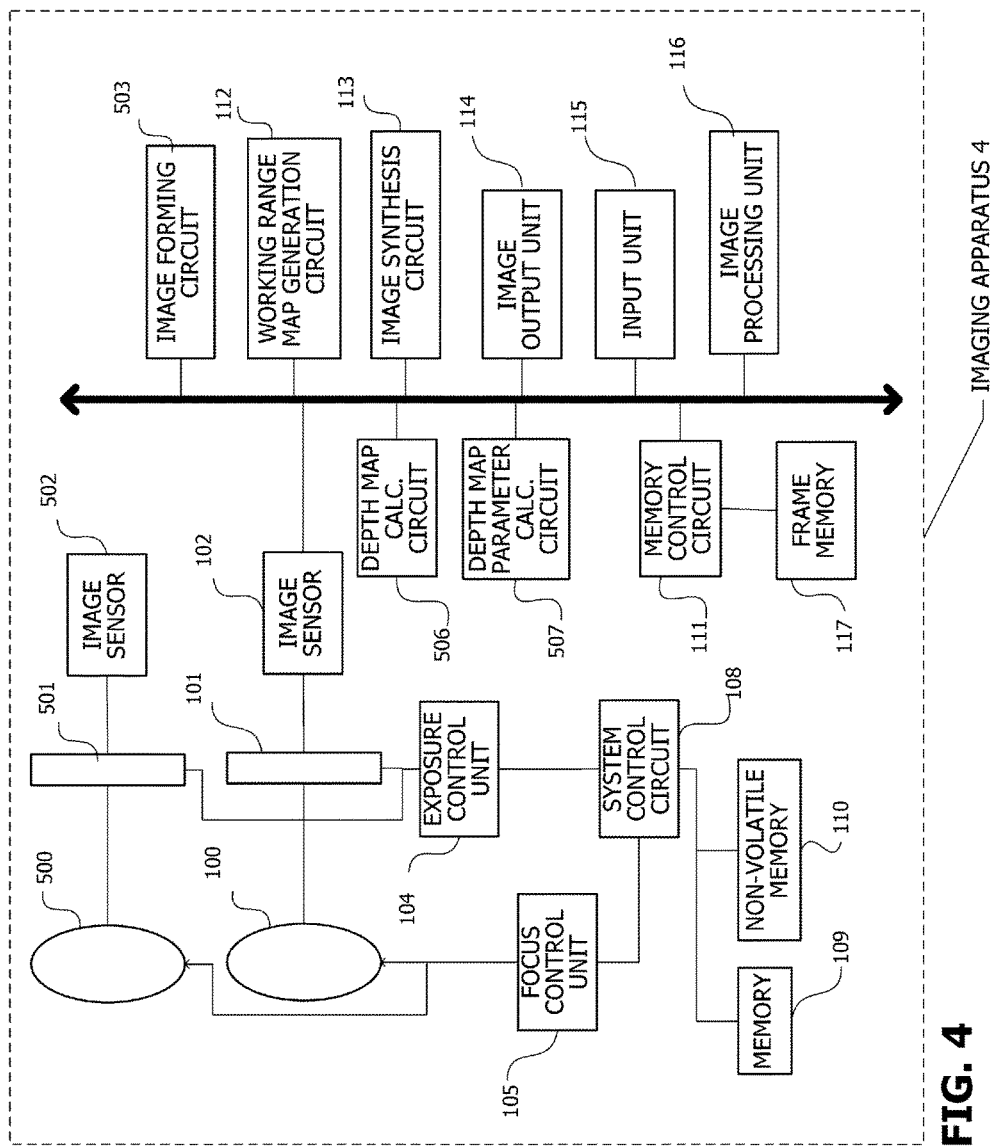
FIG. 4 is a block diagram showing the configuration of an imaging apparatus according to Example 2.

The configuration of an imaging apparatus in this example is shown in FIG. 4. Those in the imaging apparatus of this example that are common with the imaging apparatus 1 shown in FIG. 1 are denoted by the same reference numerals as in FIG. 1, and only the differences will be described.

Since an imaging apparatus 4 according to this example employs a twin-lens stereo approach, one set of a lens 500, an exposure control member 501, and an image sensor 502 are added. The exposure control unit 104 and the focus control unit 105 for control thereof control two sets of the exposure control member and the lens. The image forming circuit 503 images the output from the two image sensors 102 and 502. A depth map calculation circuit 506 and a depth map parameter calculation circuit 507 are circuits that respectively perform depth map calculation and parameter setting corresponding to the stereo approach. Assume that the optical axes of the two lenses are adjusted. The base line length is fixed herein, but a mechanism for changing the base line length may be added without particular limitation.

(Flow of Processing)

Next, the flow of processing in the case of the imaging apparatus of this example will be described using a flowchart. The flow of processing in this example is similar to the flow of processing of Example 1 in FIG. 2 and differs only in processing content in the respective steps of step S204 and step S205. Therefore, only the differences will be described.

In step S204, it suffices to perform depth map calculation with the stereo method. In step S204, a calculation parameter for the stereo method is set. Specifically, as shown in expression 10, the subject depth is determined by the base line length b and the parallax d. In the case where the base line length b is fixed, the working range is determined by the search range of the parallax d (search range in block matching). The search range being d0 means that, when the reference image is at (x, y) of a left image, a region most similar to a range represented by (x±d0, y) in a right image is to be searched. Note that the search range is only in the horizontal direction, assuming that the optical axis direction and height of the imaging apparatus are corrected. However, in the case where correction is not performed, it suffices that the search range be in the perpendicular direction or the like. The relationship of the search range d0 of parallax and the search range of subject depth can be acquired from expression 10. If the configuration is such that the base line length b is variable, the working range may be adjusted by changing the base line length b.

Step S206 to step S208 are the same processing as in Example 1, and therefore description is omitted.

In step S209, the working range is changed as instructed by a photographer. Specifically, in the case where an instruction for increasing the working range to the near side of the photographer is given, it can be carried out by increasing the search range d0 of block matching. In the case where the working range is to be increased in the depth direction, it suffices to increase the focal length f or the base line length b, as can be seen from expression 10.

(Advantageous Effect)

There is an effect that checking of the working range of the depth map is possible before shooting is complete and that it is possible to reliably acquire an image processing result desired by the photographer, even in the case where the depth map acquiring approach is the stereo method as described above.

(Modified Example)

Although the example of the twin-lens stereo approach has been described above, it is also possible to apply the present invention to an imaging apparatus in which a pupil of an optical system is divided to acquire an image from two viewing points with one optical system.

Other Examples

Specific implementation in the device is possible through implementation by software (program) and implementation by hardware. For example, the present invention can be carried out with a system or a computer (or a device such as a CPU or MPU) of a device in which the function of the embodiment described above is realized by reading and executing a program recorded in a storage device. Also, for example, the present invention can be carried out with a method including a step executed by a system or a computer of a device in which the function of the embodiment described above is realized by reading and executing a program recorded in a storage device. For this purpose, the program is provided to the computer, for example, through a network or from various types of recording medium (i.e., computer-readable recording medium that holds data non-temporarily) that can be the storage device. Thus, the computer (including devices such as a CPU and MPU), the method, the program (including program codes and program products), and the computer-readable recording medium that holds the program non-temporarily are all included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-161267, filed on Aug. 2, 2013, which is hereby incorporated by reference herein in its entirety.

What is claimed is:

1. An image processing apparatus comprising:
an image acquirer configured to acquire an image of an object;
a depth map acquirer configured to acquire a first depth map, wherein the first depth map indicates depth information of the object;
a working range map generator configured to generate a working range map on the basis of the first depth map;
a synthesizer configured to synthesize the image and the working range map and to generate a synthesized image;
a display controller configured to display the synthesized image on a display device; and
a parameter changer configured to change a parameter for depth map acquisition used by the depth map acquirer based on a change in a depth map working range,
wherein the parameter for depth map acquisition includes an F-number and a focus bracket amount,
wherein the working range map is a map for distinguishing between an area where depth information of the object is within a measurable range and an area where depth information of the object is not within the measurable range, and the working range map is determined on the basis of a parameter for depth map acquisition, and
wherein the parameter changer is configured to (1) change the F-number if a degree of the change in the depth map working range is greater than a predetermined threshold value, and (2) change the focus bracket amount if the degree of the change in the depth map working range is less than or equal to the predetermined threshold value.

2. The image processing apparatus according to claim 1, further comprising:
   a change input device configured to accept, from a user, a change instruction for a working range of the depth map acquirer; and
   an image processor configured to perform image processing on the image on the basis of a depth map,
   wherein the parameter changer changes the parameter for depth map acquisition used by the depth map acquirer, on the basis of the working range changed by the change input device,
   wherein the depth map acquirer acquires a second depth map using the parameter for depth map acquisition changed by the parameter changer, and
   wherein the image processor is configured to perform image processing on the image on the basis of the second depth map.

3. The image processing apparatus according to claim 2, wherein a resolution of the first depth map is lower than a resolution of the second depth map.

4. The image processing apparatus according to claim 2, wherein the parameter changer is configured to change the parameter for depth map acquisition on the basis of a degree of change, by the change input device, between a working range before change and a working range after change.

5. The image processing apparatus according to claim 4, wherein the depth map acquirer is configured to acquire a depth map by DFD.

6. The image processing apparatus according to claim 1, wherein the depth map acquirer is configured to acquire a depth map by any one of a stereo method, DFD, and DFF.

7. The image processing apparatus according to claim 1, wherein the synthesized image shows the area on the image in an identifiable manner.

8. The image processing apparatus according to claim 1, wherein the first depth map is based on at least one of PSF peak ratio, parallax, defocus amount, an image surface side depth, and an object side depth.

9. A method of controlling an image processing apparatus, comprising:
   an image acquiring step of acquiring an image of an object;
   a first depth map acquiring step of acquiring a first depth map, wherein the first depth map indicates depth information of the object;
   a working range map generating step of generating a working range map showing a working range in the image on the basis of the first depth map;
   a synthesizing step of synthesizing the image and the working range map and generating a synthesized image;
   a displaying step of displaying the synthesized image on a display device; and
   a parameter changing step of changing a parameter for depth map acquisition based on a change in a depth map working range,
   wherein the working range map is a map for distinguishing between an area where depth information of the object is within a measurable range and an area where depth information of the object is not within the measurable range, and the working range is determined on the basis of a parameter for depth map acquisition,
   wherein the parameter for depth map acquisition includes an F-number and a focus bracket amount, and
   wherein, in the parameter changing step, (1) the F-number is changed if a degree of change in the depth map working range is greater than a predetermined threshold value, and (2) the focus bracket amount is changed if the degree of change of the depth map working range is less than or equal to the predetermined threshold value.

10. The method of controlling an image processing apparatus according to claim 9, further comprising:
    a change instructing step of accepting a change instruction for the working range from a user;
    a second depth map acquiring step of acquiring a second depth map using the changed parameter for depth map acquisition; and
    an image processing step of performing image processing on the image on the basis of the second depth map.

11. The method of controlling an image processing apparatus according to claim 10, wherein a resolution of the first depth map is lower than a resolution of the second depth map.

12. The method of controlling an image processing apparatus according to claim 10, wherein, in the parameter changing step, the parameter for depth map acquisition is changed on the basis of a degree of change, in the change instructing step, between a working range before change and a working range after change.

13. The method of controlling an image processing apparatus according to claim 12, wherein a depth map is acquired by DFD.

14. The method of controlling an image processing apparatus according to claim 9, wherein a depth map is acquired by any one of a stereo method, DFD, and DFF.

15. A non-transitory computer-readable medium, storing a program allowing a computer to execute each step of a method of controlling an image processing apparatus, the method comprising:
    an image acquiring step of acquiring an image of an object;
    a first depth map acquiring step of acquiring a first depth map, wherein the first depth map indicates depth information of the object;
    a working range map generating step of generating a working range map showing a working range in the image on the basis of the first depth map;
    a synthesizing step of synthesizing the image and the working range map and generating a synthesized image;
    a displaying step of displaying the synthesized image on a display device; and
    a parameter changing step of changing a parameter for depth map acquisition based on a change in a depth map working range,
    wherein the working range map is a map for distinguishing between an area where depth information of the object is within a measurable range and an area where depth information of the object is not within the measurable range, and the working range is determined on the basis of a parameter for depth map acquisition,
    wherein the parameter for depth map acquisition includes an F-number and a focus bracket amount, and wherein, in the parameter changing step, (1) the F-number is changed if a degree of change in the depth map working range is greater than a predetermined threshold value, and (2) the focus bracket amount is changed if the degree of change in the depth map working range is less than or equal to the predetermined threshold value.

\* \* \* \* \*